(12) United States Patent
Kurokawa et al.

(10) Patent No.: US 12,153,582 B2
(45) Date of Patent: Nov. 26, 2024

(54) STORAGE SYSTEM AND DATA CACHE METHOD

(71) Applicant: Hitachi, Ltd., Tokyo (JP)

(72) Inventors: Yoshiki Kurokawa, Tokyo (JP); Satoru Watanabe, Tokyo (JP); Norifumi Nishikawa, Tokyo (JP); Kazuhiko Mogi, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 17/893,570

(22) Filed: Aug. 23, 2022

(65) Prior Publication Data

US 2023/0297575 A1    Sep. 21, 2023

(30) Foreign Application Priority Data

Mar. 18, 2022    (JP) ................................. 2022-043724

(51) Int. Cl.
  *G06F 16/2455*    (2019.01)
  *G06F 16/22*      (2019.01)
  *G06F 16/242*     (2019.01)

(52) U.S. Cl.
  CPC ...... *G06F 16/24557* (2019.01); *G06F 16/221* (2019.01); *G06F 16/244* (2019.01)

(58) Field of Classification Search
  CPC . G06F 16/24557; G06F 16/221; G06F 16/244
  See application file for complete search history.

(56) References Cited

U.S. PATENT DOCUMENTS

| 5,822,780 | A | 10/1998 | Schutzman |
| 2012/0030179 | A1* | 2/2012 | Kauffman ............. G06F 16/248 711/111 |
| 2013/0166568 | A1 | 6/2013 | Binkert et al. |
| 2015/0234922 | A1 | 8/2015 | Dageville et al. |
| 2023/0141891 | A1* | 5/2023 | Huang .................. G06F 16/221 707/715 |

FOREIGN PATENT DOCUMENTS

| JP | 6617117 B2 | 12/2019 |
| JP | 6730189 B2 | 7/2020 |

\* cited by examiner

*Primary Examiner* — Hosain T Alam
*Assistant Examiner* — Chongsuh Park
(74) *Attorney, Agent, or Firm* — MATTINGLY & MALUR, PC (57) ABSTRACT

A database management system identifies a required column which is required for executing the query, reads out data of the identified required column from a storage device, and executes the query based on the data of the required column. When reading out the data of the required column, the database management system preferentially reads out the data of the required column from a high-speed storage device storing the data of the required column among a memory, a second storage, and a first storage, stores, in the memory, data of the second data size unit including the data of the required column used for executing the query, and, when the data of the required column is read out from the first storage, stores the data of the second data size unit in the memory and stores the read-out data of the first data size unit in the second storage.

6 Claims, 7 Drawing Sheets

STORAGE SYSTEM AND DATA CACHE METHOD

CROSS REFERENCE TO RELATED APPLICATIONS

This application claims benefit of Japanese Application No. 2022-043724, filed on Mar. 18, 2022, the entire contents of each are hereby incorporated by reference.

TECHNICAL FIELD

The present invention relates to a storage system and a data cache method, and can be suitably applied to a storage system and a data cache method of hierarchically managing data caches of a database.

BACKGROUND ART

In recent years, pursuant to the explosive increase of data, the need to speed up the database as the key middleware in handling data and increase the amount of data that can be handled is increasing. As measures for dealing with this kind of demand, for example, efforts for scaling out the database processing and speeding up the processing of an enormous amount of data by building a database in the cloud and implementing search processing or connection processing based on distributed parallel processing are being made.

Nevertheless, while the use of a cloud will enable a scale-out, the running cost will depend on the scale, and, when attempting to perpetuate the storage in particular, the usage will increase according to the capacity of the storage. Furthermore, the pricing of clouds tends to be more expensive for those having a high processing speed and less expensive for those having a low processing speed. Accordingly, while lower costs are expected by utilizing an object storage, it was necessary to devise a method that does not deteriorate the performance.

As this kind of devisal, for example, PTL 1 discloses, as a data distribution method, a technology of dividing the storage area of a database into a plurality of areas and hierarchically storing and managing data by performing hierarchical storage management (HSM) using a slower tertiary storage (for example, tape media) subjacent to a secondary storage (for example, hard disk drive). A time stamp is used with this data management and, when there is a shortage of the storage area in the secondary storage, the time stamp is used to decide the area to which the data is to be written back to the third storage.

CITATION LIST

Patent Literature

[PTL 1] Specification of U.S. Pat. No. 5,822,780

SUMMARY OF THE INVENTION

Problems to be Solved by the Invention

When dividing the storage area in a cloud database and reading out and managing data as with the technology disclosed in PTL 1, as a result of hierarchically configuring the caches by also using a main memory and the like, data can be acquired with a faster access time of the main memory by hierarchically configuring the caches. Here, when the data size (cache size) to be stored in the cache is large, as a result of the data area, which is not used when caching data, being cached, the cache efficiency will deteriorate. Meanwhile, in cases where the cache size is reduced, access becomes a latency bottleneck when using a medium having a large latency such as an object storage on a network, and this will lead to deterioration in the performance.

The foregoing problem can be resolved by handling data as a unit of a small area with a high-speed cache using a memory or the like, and handling data as a unit of a large area with a low-speed storage such as an object storage. In the foregoing case, when placing emphasis on cache efficiency, a large area is read out from the low-speed storage, and a micro area as the read-out target is extracted from the read-out large area and cached in the high-speed memory.

Nevertheless, here, since parts other than the foregoing micro area among the large area read out from the low-speed storage are discarded without being cached in the memory, when a different micro area from the same large area subsequently becomes the read-out target, it becomes necessary to once again read in a large area from the low-speed storage. In other words, with the conventional technology, when the handling unit (area) of data is changed for each storage by placing emphasis on cache efficiency, there is a problem in that useless reading from the low-speed storage will increase, and the overall efficiency will deteriorate.

The present invention was devised in view of the foregoing points, and an object of this invention is to propose a storage system and a data cache method capable of reducing useless reading from a low-speed storage such as an object storage while increasing the efficiency of a memory cache, and thereby improve the performance of search or connection in a database.

Means to Solve the Problems

In order to achieve the foregoing object, the present invention provides a storage system which stores data of a database, comprising: a database management system which manages the database based on an execution of a program by a processor; and a storage device, wherein the storage device includes: a first storage which stores data of a table of the database; a second storage in which reading and writing of data is faster than the first storage; and a memory in which reading and writing of data is faster than the second storage; the first storage reads and writes data in a first data size unit and the memory reads and writes data in a second data size unit that is smaller than the first data size unit; when the database management system executes a query as an inquiry to the database, the database management system: interprets the query and identifies a required column which is required for executing the query; reads out data of the identified required column from the storage device; executes the query based on the data of the required column read out from the storage device; when reading out the data of the required column from the storage device, preferentially reads out the data of the required column from a high-speed storage device storing the data of the required column among the memory, the second storage, and the first storage; stores, in the memory, data of the second data size unit including the data of the required column used for executing the query; and when the data of the required column is read out from the first storage, stores the data of the second data size unit in the memory and stores the read-out data of the first data size unit in the second storage.

Moreover, in order to achieve the foregoing object, the present invention additionally provides a data cache method performed by a storage system which stores data of a database, wherein the storage system comprises: a database management system which manages the database based on an execution of a program by a processor; and a storage device, wherein the storage device includes: a first storage which stores data of an entire table of the database; a second storage in which reading and writing of data is faster than the first storage; and a memory in which reading and writing of data is faster than the second storage; the first storage reads and writes data in a first data size unit and the memory reads and writes data in a second data size unit that is smaller than the first data size unit; when the database management system executes a query as an inquiry to the database, the data cache method comprises: a required column identification step of the database management system interpreting the query and identifying a required column which is required for executing the query; a data read-out step of the database management system reading out, from the storage device, data of the required column identified in the required column identification step; and a query execution step of the database management system executing the query based on the data of the required column read out in the data read-out step; in the data read-out step, the database management system: preferentially reads out the data of the required column from a high-speed storage device storing the data of the required column among the memory, the second storage, and the first storage; stores, in the memory, data of the second data size unit including the data of the required column used for executing the query; and when the data of the required column is read out from the first storage, stores the data of the second data size unit in the memory and stores the read-out data of the first data size unit in the second storage.

Advantageous Effects of the Invention

According to the present invention, it is possible to reduce useless reading from a low-speed storage while improving the efficiency of the memory cache, and thereby improve the performance of search or connection in the database.

DESCRIPTION OF EMBODIMENTS

An embodiment of the present invention is now explained in detail with reference to the appended drawings.

Note that the following descriptions and drawings are merely examples for explaining the present invention, and certain descriptions and drawings have been omitted or simplified as needed in order to clarify the explanation. Moreover, all combinations of the features explained in the embodiment may not necessarily be essential as the solution of the invention. Without limitation to the embodiments described herein, any and all applications that coincide with the concept of the present invention are included in the technical scope of the present invention. Those skilled in the art may make various additions or changes to the present invention within the scope of the present invention. The present invention can also be worked in various other modes. Unless specifically limited herein, each of the constituent elements may be singular or plural.

Moreover, in the following explanation, when explaining similar elements without distinction, a reference character or a common number in a reference character will be used, and when explaining similar elements distinctively, a reference character of such element may be used or an ID assigned to such element in substitute for a reference character may be used.

Moreover, in the following explanation, while there are cases where processing, which is performed by executing programs, is explained, because a program performs predetermined processing by suitably using a storage resource (for example, memory) and/or an interface device (for example, communication port) as a result of being executed at least by one or more processors (for example, CPUs), the subject of the processing may also be the processor. Similarly, the subject of the processing to be performed by executing programs may be a controller, a device, a system, a computer, a node, a storage system, a storage device, a server, a management computer, a client or a host equipped with a processor. The subject (for example, processor) of the processing to be performed by executing programs may include a hardware circuit which performs a part or all of the processing. For example, the subject of the processing to be performed by executing programs may include a hardware circuit which executes encryption and decryption, or compression and expansion. The processor operates as function parts which realize predetermined functions by being operated according to programs. A device and a system including a processor are a device and a system including these function parts.

The programs may also be installed in a device, such a computer, from a program source. The program source may be, for example, a program distribution server or a computer-readable storage media. When the program source is a program distribution server, the program distribution server includes a processor (for example, CPU) and a storage resource, and the storage resource may additionally store a distribution program and programs to be distributed. Furthermore, the processor of the program distribution server may distribute the programs to be distributed to another computer as a result of the processing of the program distribution server executing the distribution program. Moreover, in the following explanation, two or more programs may be realized as one program, and one program may be realized as two or more programs.

(1) Configuration

Figure 1:
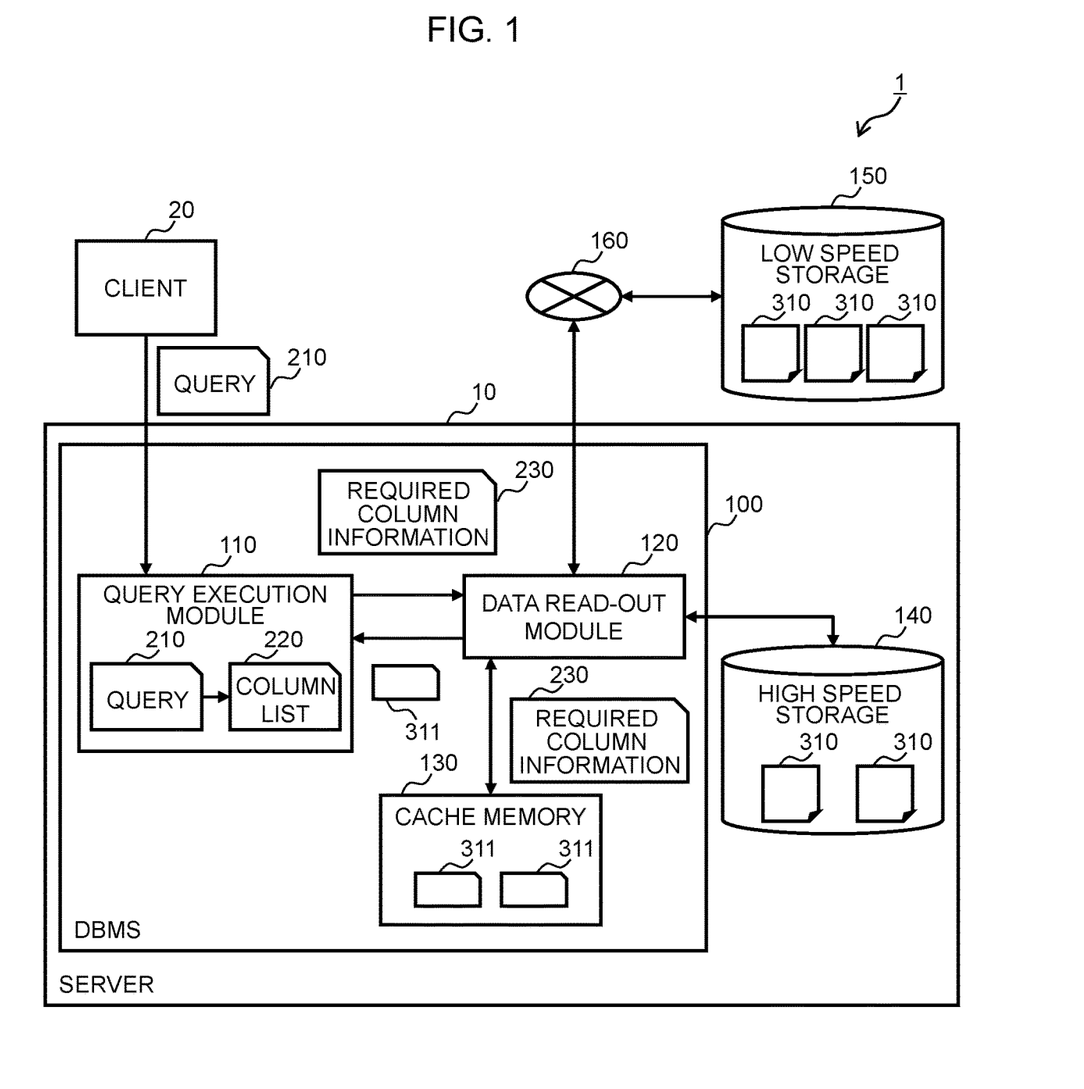
FIG. 1 is a block diagram showing a configuration example of the storage system 1 according to an embodiment of the present invention.

FIG. 1 is a block diagram showing a configuration example of the storage system 1 according to an embodiment of the present invention. The storage system 1 is a system which hierarchically manages data caches of a database, and comprises a server 10 to which is input a query 210 from a client 20, and a low speed storage 150 which is connected to the server 10 (DBMS 100) via a network 160.

The client 20 is a client computer. The client 20 is the source of data processing such as search processing and sends a request in the form of a query 210 to the server 10, and receives a result of the query 210 from the server 10.

The server 10 is a database server. The server 10 is a computer that executes the DBMS 100, and comprises a high speed storage 140. As its hardware configuration, the server 10 comprises, as with a standard database server, a processor such as a CPU (Central Processing Unit), a main memory (main storage device), an auxiliary storage device, and various interfaces. The DBMS 100 is a software program, and its functions are realized by being read into the main memory and executed by the processor. In FIG. 1, while a cache memory 130 is indicated to be within the DBMS 100 on the assumption of being run on the main memory, the configuration may also be such that the cache memory 130 is provided between the processor and the main memory. The high speed storage 140 is an auxiliary storage device. Moreover, as an example of the various interfaces, considered may be a communication interface having a communication function for communicating with the network 160 connected to the low speed storage 150.

When the server 10 receives a query 210 from the client 20, the server 10 executes a function such as a search according to the contents of the query 210 by executing the DBMS 100, and returns the result of the query 210 to the client 20.

The DBMS 100 is database software for loading a database function in the server 10, and is a so-called DataBase Management System (DBMS). With the DBMS 100, for example, a program is stored in an auxiliary storage device of the server 10, and the program is read out into the main memory, and executed by the processor.

The DBMS 100 has a query execution module 110 and a data read-out module 120 built therein as function modules, and a function such as a database research is realized by executing each of these modules.

A query 210 is an inquiry describing the processing to be performed in the database (DBMS 100), and specifically describes designations such as the data of which column should be used for the search, and the data of which column should be output. The query 210 encompasses all information required for performing the search based on the query itself. A query 210 is described, for example, using SQL.

The query execution module 110 includes a function of interpreting a query 210 and generating a column list 220, generating required column information 230 from the column list 220, sending the required column information 230 to the data read-out module 120, and requesting the data read-out module 120 to read out required column data.

The column list 220 is a list of columns (used columns) to be used in executing a query 210, and is generated by the query execution module 110 based on the query 210.

The required column information 230 is a list of columns (required columns) that need to be read out by the data read-out module 120 among the columns included in the column list 220, and shows the classification of usage such as whether those columns will be used for search or whether those columns will be used for aggregation. The required column information 230 is generated by the query execution module 110, and used by the data read-out module 120.

The data read-out module 120 has a function of reading out the data (required columns) that need to be read out in the execution of the query 210 from one among the various storages (cache memory 130, high speed storage 140, low speed storage 150) based on the required column information 230. While the details will be described later, when reading out a required column from a storage, the data read-out module 120 reads out the required column from the cache memory 130 when it exists in the cache memory 130, and, when it does not exist in the cache memory 130, the data read-out module 120 confirms whether the required column exists in the high speed storage 140 and reads out the required column from the high speed storage 140 when it exists in the high speed storage 140, and, when it does not exist in the high speed storage 140, the data read-out module 120 reads out the required column from the low speed storage 150 via the network 160.

Figure 2:
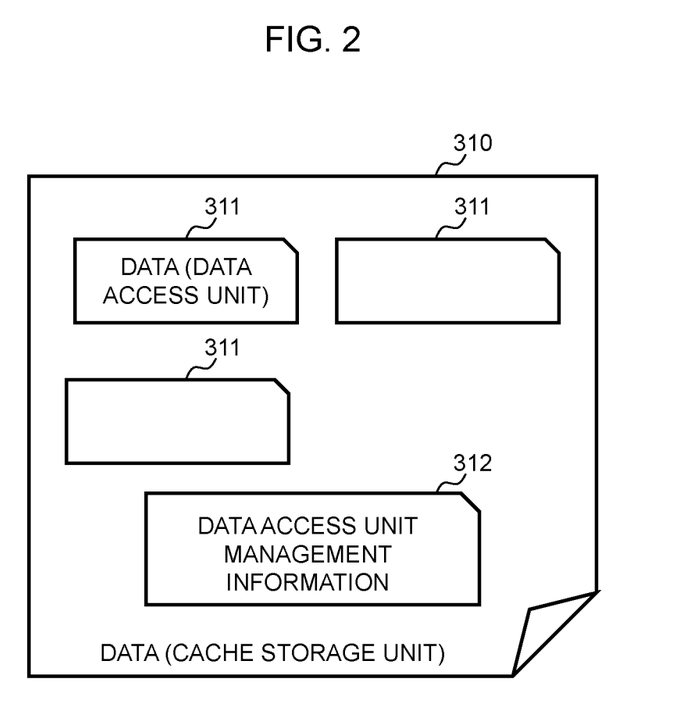
FIG. 2 is a diagram showing a structural example of the cache storage unit 310.

Here, the low speed storage 150 and the high speed storage 140 stores data of a database in the format of a cache storage unit (data 310). As shown in FIG. 2 described later, the data 310 of the cache storage unit is configured by including data 311 of one or more data access units, and at least one piece of data access unit management information 312. Subsequently, the cache memory 130 stores the data in the format of a data access unit (data 311). Specifically, when the data read-out module 120 reads out the data 310 including the required column from the low speed storage 150, the data read-out module 120 stores the data 310 in the high speed storage 140, and stores the data 311 including the required column within the data 310 in the cache memory 130.

For simplification in the following explanation, the data 310 of the cache storage unit may be referred to as the "cache storage unit 310", and the data 311 of the data access unit may be referred to as the "data access unit 311".

The cache storage unit 310 is the unit of handling data in the low speed storage 150, and internally includes the data 311 of one or more data access units. Moreover, the cache storage unit 310 is also used as the unit of write-in and storage/management in the high speed storage 140. As described above, when the data read-out module 120 reads out the required column based on a request of the required column information 230, the data read-out module 120 selects and reads out the data access unit 311 having the required column from within the cache storage unit 310 including the required column.

The data access unit 311 is a basic unit of the DBMS 100 accessing data, and is a unit of handling data in the cache memory 130 and the high speed storage 140. Technically, the high speed storage 140 performs the write-in and storage/management of data in the cache storage unit 310, and performs the read-out of data in the data access unit 311. Moreover, data sent from the data read-out module 120 to the query execution module 110 is also the data access unit 311.

FIG. 2 is a diagram showing a structural example of the cache storage unit 310. As shown in FIG. 2, the cache storage unit 310 is configured by including one or more data access units 311, and at least one piece of data access unit management information 312. The data access unit management information 312 is management information for managing the data access unit 311 existing inside the cache storage unit 310. The data access unit management information 312 retains, regarding each data access unit 311, information showing at least from where the data was acquired and in which column the data was included. As a result of the cache storage unit 310 retaining this kind of data access unit management information 312, the data read-out module 120 can identify, in the data access unit 311, the data of the column included in the cache storage unit 310, and selectively store the identified data access unit 311 in the cache memory 130.

The cache memory 130 is a cache memory provided for improving the access performance of the processing of the server 10 in accessing data and is specifically, for example, a DRAM (Dynamic Random Access Memory). The cache memory 130 is one type of storage device configuring hierarchical caches in the storage system 1, and has the highest access performance (fastest data processing speed) compared to the high speed storage 140 and the low speed storage 150 configuring other hierarchical caches.

When the data read-out module 120 reads out the data 310 including the required column requested in the required column information 230 from the low speed storage 150 or the high speed storage 140, the cache memory 130 stores the required column included in the data 310 in the format (data 311) of the data access unit. In the subsequent reading out of data, whether the cache memory 130 is storing the required column is searched, and, when the corresponding data is stored in the cache memory 130, the data read-out module 120 reads out such data and sends it to the query execution module 110.

The high speed storage 140 is normally an embedded storage installed in the server 10 and is specifically, for example, an SSD (Solid State Drive). While the storage capacity of the high speed storage 140 is greater than that of the cache memory 130, it is smaller than that of the low speed storage 150. The storage unit (write-in unit) of data in the high speed storage 140 is the cache storage unit 310 that is common with the low speed storage 150. Meanwhile, the data read-out unit in the high speed storage 140 is the data access unit 311 that is common with the query execution module 110 and the cache memory 130. As described above, the high speed storage 140 stores the cache storage unit 310 read in by the data read-out module 120 from the low speed storage 150. The processing speed (for example, speed of reading and writing) of data in the high speed storage 140 is at least faster than that of the low speed storage 150.

Note that, when the high speed storage 140 no longer has any area for storing a new cache storage unit 310, a cache storage unit 310 that has not been used for a long period is selected among deletable data by using the LRU (Least Recently Used) method or the like and erased (invalidated) to secure an area for storing a new cache storage unit 310.

The low speed storage 150 is a storage installed outside the server 10, and is connected to the server 10 via the network 160. The low speed storage 150 is specifically, for example, an object storage or a NAS (Network Attached Storage). While the processing speed (for example, speed of reading and writing) of data in the low speed storage 150 is slower than that of the high speed storage 140 or the cache memory 130, the cost to use the low speed storage 150 is relatively low. The low speed storage 150 stores data of the entire table of the database used by the storage system 1 as a plurality of object files (data 310) in the format of the cache storage unit.

The network 160 is a network which connects the server 10 and the low speed storage 150 installed outside the server 10, and is used for reading out the required data among a plurality of data 310 in the cache storage unit stored in the low speed storage 150. The network 160 is specifically, for example, the Ethernet, but it may also be other systems.

The overall configuration of the storage system 1 according to this embodiment was explained above. The storage system 1 configured in the foregoing manner performs the following operations.

Foremost, a query 210 of a search from the client 20 is issued to the server 10. In the server 10, the query execution module 110 inside the DBMS 100 receives the query 210, and creates a column list 220 from the query 210. Subsequently, the query execution module 110 creates the required column information 230 for requesting the read-out of the required column, which is required in the query 210, from the column list 220, and sends it to the data read-out module 120. The data read-out module 120 that received the required column information 230 foremost checks the cache memory 130 and, when the required data access unit 311 is stored therein, reads out such data access unit 311. When the required data access unit 311 is not stored in the cache memory 130, the data read-out module 120 checks the high speed storage 140 and, when the required data access unit 311 is stored therein, reads out such data access unit 311. When the required data access unit 311 is not stored in the high speed storage 140, the data read-out module 120 reads the cache storage unit 310 including the required data from the low speed storage 150 and stores it in the high speed storage 140, and reads out the required data access unit 311 from the stored cache storage unit 310. Furthermore, here, the data access unit 311 of all columns indicated in the required column information 230 is extracted from the cache storage unit 310, which is stored in the high speed storage 140, and then stored in the cache memory 130. Based on this kind of operation, the data (data of the entire table of the database) stored in the low speed storage 150 can be hierarchically managed as caches by utilizing the high speed storage 140 and the cache memory 130. In particular, by extracting the data of the column indicated in the required column information 230 in a small handling unit (data access unit) from the data of a large handling unit that was read out from the low speed storage 150 and storing it in the cache memory 130, since data that is likely to be read out in the future can be cached in the cache memory 130 in a small handling unit, it is possible to increase the cache hit rate in the memory (cache memory 130) and speed up the execution of the query 210 by suppressing the useless reading from the low speed storage 150.

(1-1) Data Read-Out Module 120

Figure 3:
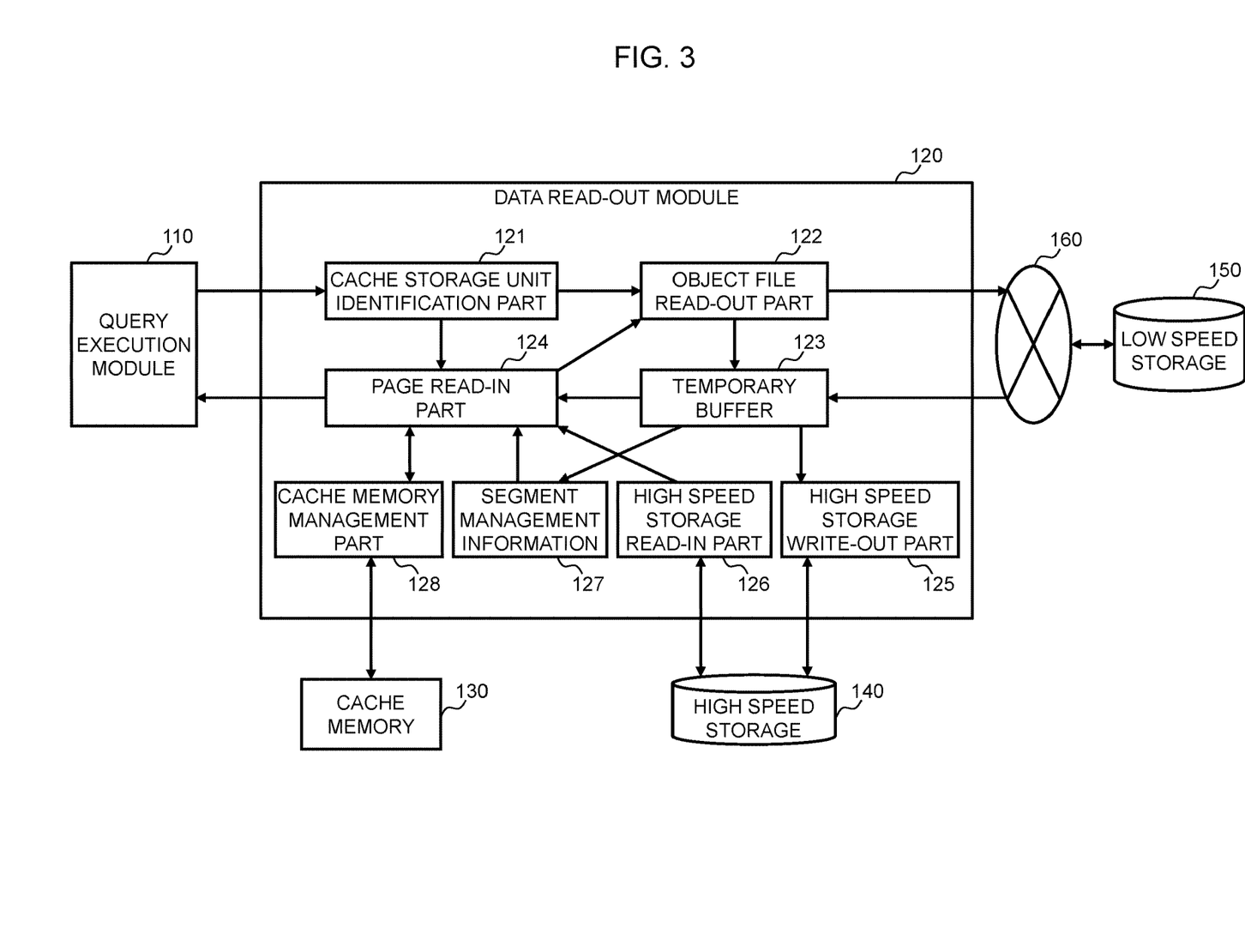
FIG. 3 is a block diagram showing an internal configuration example of the data read-out module 120.

FIG. 3 is a block diagram showing an internal configuration example of the data read-out module 120. As shown in FIG. 3, the data read-out module 120 includes a cache storage unit identification part 121, an object file read-out part 122, a temporary buffer 123, a page read-in part 124, a high speed storage write-out part 125, a high speed storage read-in part 126, segment management information 127, and a cache memory management part 128.

The cache storage unit identification part 121 uses the required column information 230 issued by the query execution module 110 and identifies the cache storage unit 310 included in the column data (data access unit 311 of the required column) required for executing the query 210. Subsequently, the cache storage unit identification part 121 creates a list of the identified cache storage units 310, and sends it to the page read-in part 124 and the object file read-out part 122.

The object file read-out part 122 is a mechanism for issuing a sequence of reading out the desired object files from the storage that is storing the object files. In the case of this example, the low speed storage 150 is the storage that is handling the object files. In order to realize the foregoing mechanism, the object file read-out part 122 has a function of operating the network 160 and connecting to the low speed storage 150 on the network 160, and reading out a specified cache storage unit 310 from the low speed storage 150. Specifically, the object file read-out part 122 reads out the cache storage unit 310 identified by the cache storage unit identification part 121 from the low speed storage 150 via the network 160 based on the list received from the cache storage unit identification part 121, and stores the read-out data in the temporary buffer 123.

The temporary buffer 123 is a buffer for temporarily storing the cache storage unit 310 read out via the network 160. The temporary buffer 123 is specifically, for example, a memory (DRAM). The temporary buffer 123 may store a plurality of cache storage units 310, and the data access unit management information 312 included in each cache storage unit 310 is extracted and stored as the segment management information 127. Moreover, while the temporary buffer 123 can store a given number of cache storage units 310, upon exceeding this given number, the cache storage unit 310, which has not been used for the longest time among deletable data, and the new cache storage unit 310 are interchanged based on the LRU method or the like. This interchange processing is controlled, for example, by the object file read-out part 122.

Note that, when the object file read-out part 122 reads out an object file, in cases where the cache storage unit 310 corresponding to the target object file is stored in the temporary buffer 123, the object file read-out part 122 reads out the cache storage unit 310 stored in the temporary buffer 123 without reading out any data from the low speed storage 150. Moreover, the data (cache storage unit 310) stored in the temporary buffer 123 is written out into the high speed storage 140 in a cache storage unit by the high speed storage write-out part 125.

The page read-in part 124 has a function of identifying the data access unit 311 having the required column requested in the required column information 230, and reading out this data access unit 311 and sending it to the query execution module 110.

The page read-in part 124 foremost compares the segment management information 127 and the required column information 230, and identifies the data access unit 311 having the required column among the cache storage units 310. Next, the page read-in part 124 checks whether the identified data access unit 311 exists in the cache memory 130 and, when the identified data access unit 311 exists in the cache memory 130, uses the cache memory management part 128 to read out the data access unit 311 from the cache memory 130 and send it to the query execution module 110. When the identified data access unit 311 does not exist in the cache memory 130, the page read-in part 124 confirms whether the cache storage unit 310 including the data access unit 311 is stored in the temporary buffer 123. When the corresponding cache storage unit 310 is stored in the temporary buffer 123, the page read-in part 124 reads out the data access unit 311 from the cache storage unit 310 and sends it to the query execution module 110. When the corresponding cache storage unit 310 is not stored in the temporary buffer 123, the page read-in part 124 confirms whether the cache storage unit 310 including the data access unit 311 is stored in the high speed storage 140. When the corresponding cache storage unit 310 is stored in the high speed storage 140, the page read-in part 124 uses the high speed storage read-in part 126 to read out the data access unit 311 from the cache storage unit 310 stored in the high speed storage 140 and send it to the query execution module 110. When the corresponding cache storage unit 310 is not stored in the high speed storage 140, since the cache storage unit 310 only exists in the low speed storage 150, the page read-in part 124 requests the object file read-out part 122 to read out data from the cache storage unit 310. Upon receiving this request, since the object file read-out part 122 reads out the cache storage unit 310 from the low speed storage 150 stores it in the temporary buffer 123, the page read-in part 124 extracts the data access unit 311 having the required column among the cache storage units 310 stored in the temporary buffer 123 and sends it to the query execution module 110. Moreover, here, the page read-in part 124 uses the cache memory management part 128 to store the data access unit 311 having the required column in the cache memory 130.

The high speed storage write-out part 125 is a mechanism for reading out data into the high speed storage 140. The high speed storage write-out part 125 reads out (writes in) the data into the high speed storage 140 in the cache storage unit 310. Note that, when it is not possible to secure free space in the high speed storage 140 for storing the cache storage unit 310, the high speed storage write-out part 125 uses the LRU method or the like and erases the cache storage unit 310 having an oldest last-access time among deletable data, and secures free space for storing a new cache storage unit 310 in the high speed storage 140.

The high speed storage read-in part 126 is a mechanism for reading in data from the high speed storage 140. The high speed storage read-in part 126 reads out data from the high speed storage 140 in the data access unit 311.

Segment management information 127 is information of a collection of the data access unit management information 312 existing in each of a plurality of cache storage units 310. The segment management information 127 at least includes data access unit management information 312 of the cache storage unit 310 stored in the temporary buffer 123, and data access unit management information 312 of the cache storage unit 310 in which the data access unit 311 was read out from the high speed storage 140.

The cache memory management part 128 performs management upon storing, in the cache memory 130, the data access unit 311 to be cached. When it is not possible to secure free space for storing a new data access unit 311 in the cache memory 130, the cache memory management part 128 uses the LRU method or the like and erases the data access unit 311 having the oldest last-access time among deletable data, and uses the increased free space to store the new data access unit 311 in the cache memory 130.

(2) Processing

The routine of executing a query in the storage system 1 according to this embodiment is now explained in detail. In the storage system 1, the server 10 executes the query execution processing shown in FIG. 4 and FIG. 5 in response to the query 210 issued by the client 20.

(2-1) Query Execution Processing

Figure 4:
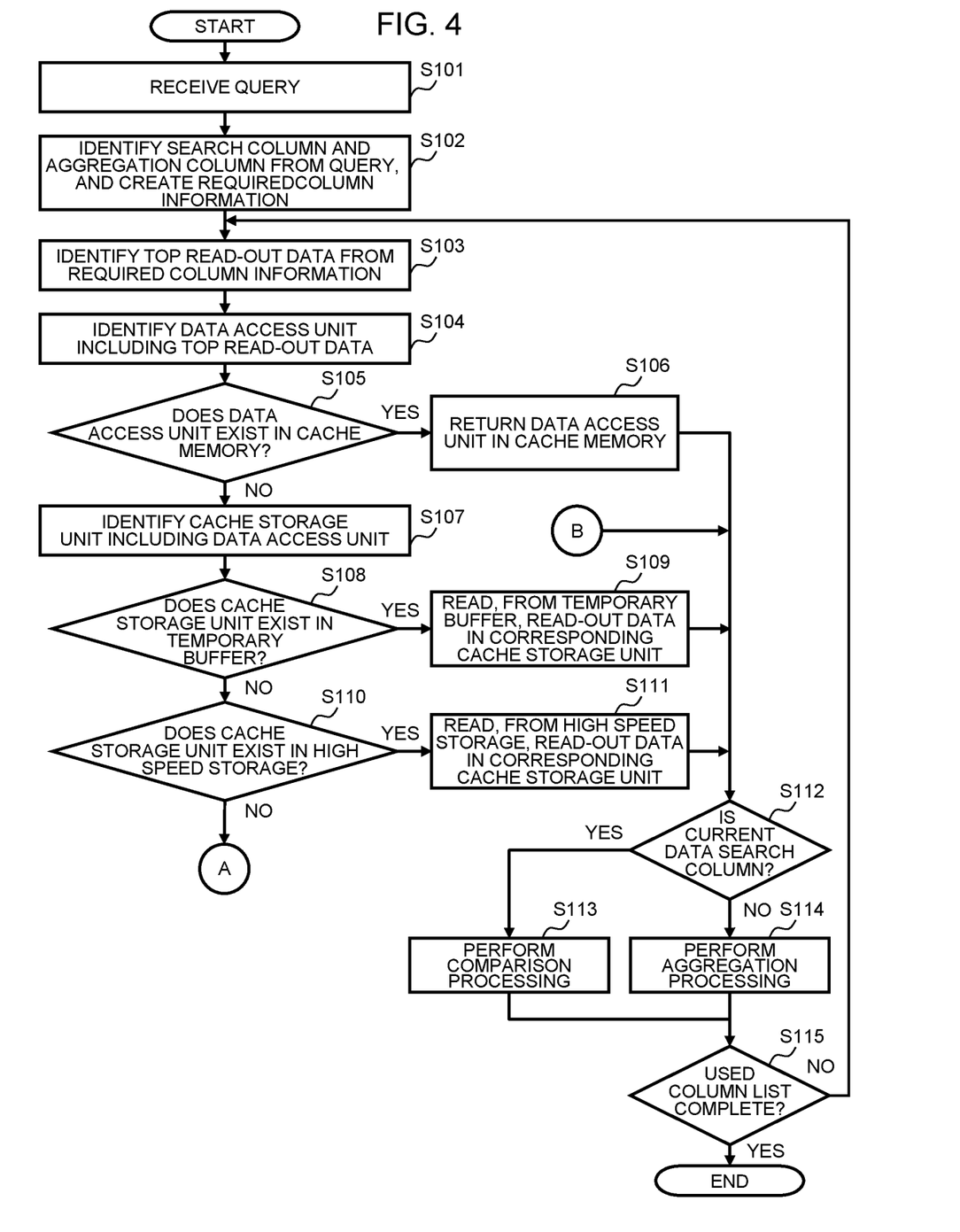
FIG. 4 is a flowchart (Part 1) showing a processing routine example of the query execution processing.
Figure 5:
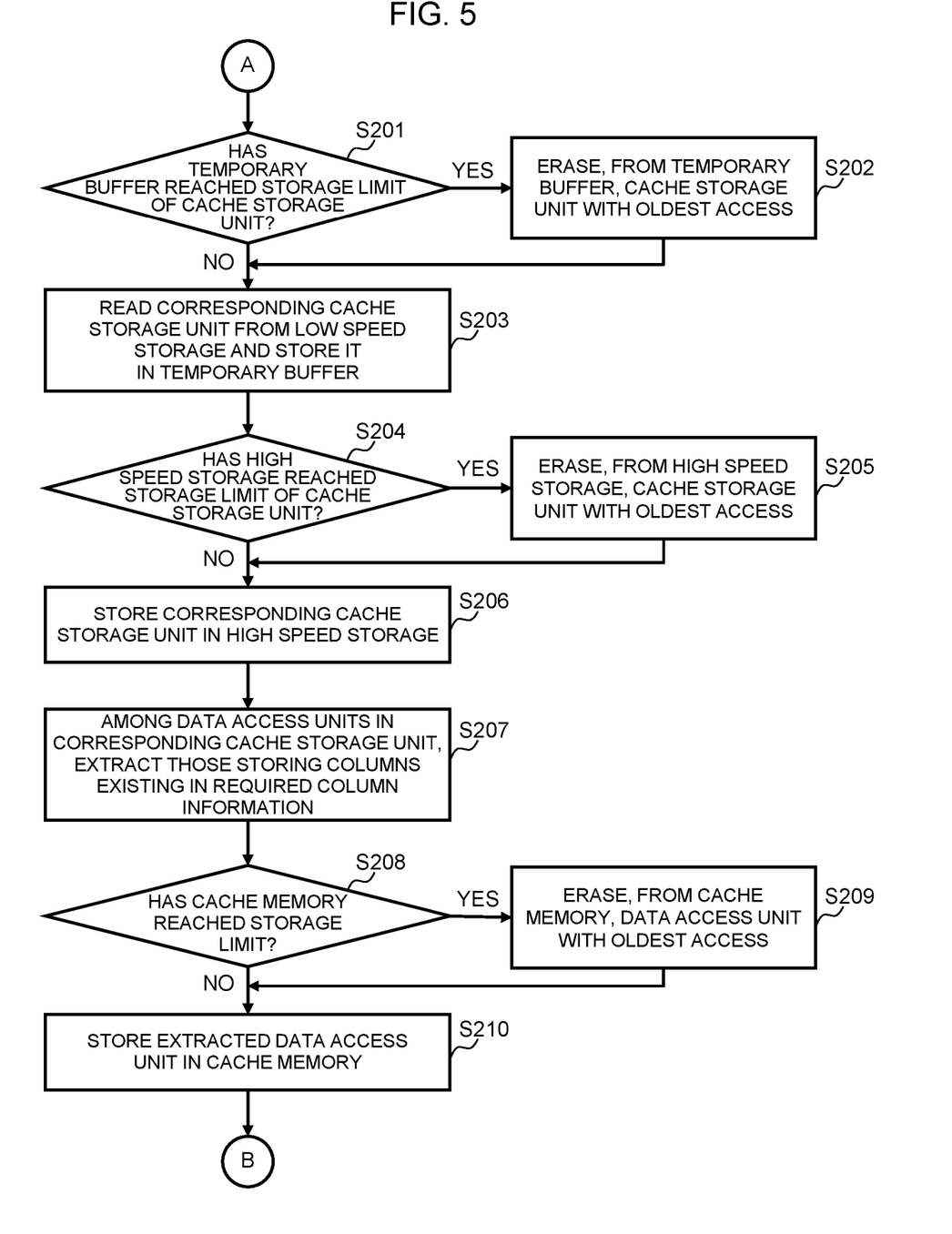
FIG. 5 is a flowchart (Part 2) showing a processing routine example of the query execution processing.

FIG. 4 and FIG. 5 are flowcharts (Part 1, Part 2) showing a processing routine example of the query execution processing. End points A and B shown in FIG. 4 respectively correspond to end points A and B shown in FIG. 5.

According to FIG. 4 and FIG. 5, foremost, the query execution module 110 receives a query 210 issued by the client 20 (step S101). Next, the query execution module 110 interprets the received query 210 and creates a list of columns (column list 220) to be used in executing the query 210, respectively identifies columns to be searched (search columns) and columns to be aggregated (aggregation columns) regarding the columns to be used included in the column list 220, and creates a list of required columns (required column information 230) that need to be read out by using the results of the foregoing identification (step S102). The required columns are listed in the required column information 230 in the calling order at the time of executing the query. The query execution module 110 sends the created required column information 230 to the data read-out module 120.

In the data read-out module 120, the cache storage unit identification part 121 identifies the top read-out data from a list of a plurality of required columns described in the required column information 230 (step S103). This "top read-out data" refers to the data of the required column described at the top among the required columns for which the read out of data has not yet been completed at such point in time in the required column information 230 in which the required columns are listed in the calling order at the time of executing the query. In other words, when the processing of step S103 is to be performed upon obtaining the result of "NO" in step S115 described later, the top read-out data is identified among the required columns that have not yet been read out at such point in time. To summarize the above, data of the required column with the earliest calling order at the time of executing the query corresponds to the "top read-out data" among the data of the requirement columns in the required column information 230 which have not yet been read out.

Next, the page read-in part 124 identifies the data access unit 311 where the top read-out data identified in step S103 exists (step S104). Note that the processing of step S104 may also be executed by the cache storage unit identification part 121. Moreover, in step S107 described later, while the cache storage unit identification part 121 identifies the cache storage unit 310 including the data access unit 311 where the top read-out data exists, the processing of step S107 may be executed before the processing of step S104 or executed by the page read-in part 124.

Next, the page read-in part 124 determines whether the data access unit 311 identified in step S104 exists in the cache memory 130 (step S105). When the data access unit 311 exists in the cache memory 130 (step S105; YES), the page read-in part 124 uses the cache memory management part 128 to read the data access unit from the cache memory 130 and return it to the query execution module 110 (step S106), and then proceeds to step S112 described later. Meanwhile, when the data access unit 311 does not exist in the cache memory 130 (step S105; NO), the cache storage unit identification part 121 (or the page read-in part 124) identifies the cache storage unit 310 including the data access unit 311 (step S107).

After the processing of step S107, the page read-in part 124 determines whether the cache storage unit 310 identified in step S107 exists in the temporary buffer 123 (step S108). When the cache storage unit 310 exists in the temporary buffer 123 (step S108, YES), the object file read-out part 122 reads out the cache storage unit 310 from the temporary buffer 123, and the page read-in part 124 reads out the data access unit 311 (read-out data) having the required column from the cache storage unit 310 (step S109), and returns it to the query execution module 110. After the processing of step S109, the routine proceeds to step S112. The processing of step S109 may also be controlled by the page read-in part 124. Meanwhile, when the cache storage unit 310 does not exist in the temporary buffer 123 in step S108 (step S108; NO), the page read-in part 124 determines whether the cache storage unit 310 exists in the high speed storage 140 (step S110).

When the target cache storage unit 310 exists in the high speed storage 140 in step S110 (step S110, YES), the high speed storage read-in part 126 reads out the data access unit 311 (read-out data) having the required column from the cache storage unit 310 stored in the high speed storage 140 (step S111), and the page read-in part 124 returns it to the query execution module 110. After the processing of step S111, the routine proceeds to step S112 described later. Meanwhile, when the target cache storage unit 310 does not exist in the high speed storage 140 in step S110 (step S110; NO), the routine proceeds to step S201 of FIG. 5.

In step S201 of FIG. 5, the object file read-out part 122 determines whether the temporary buffer 123 has reached the storage limit of the cache storage unit 310. When the temporary buffer 123 has reached the storage limit (step S201; YES), the object file read-out part 122 applies the LRU method and selects, and erases, the cache storage unit 310 having an oldest last-access time among deletable data in the temporary buffer 123 (step S202).

Meanwhile, when the temporary buffer 123 has not reached the storage limit (step S201; NO), or after step S202, the object file read-out part 122 reads out the cache storage unit 310 identified in step S107 from the low speed storage 150, and stores it in the temporary buffer 123 (step S203).

Next, the high speed storage write-out part 125 determines whether the high speed storage 140 has reached the storage limit of the cache storage unit 310 (step S204). When the high speed storage 140 has reached the storage limit (step S204; YES), the high speed storage write-out part 125 applies the LRU method and selects, and erases, the cache storage unit 310 having an oldest last-access time among deletable data in the high speed storage 140 (step S205).

Meanwhile, when the high speed storage 140 has not reached the storage limit in step S204 (step S204; NO), or after step S205, the high speed storage write-out part 125 stores, in the high speed storage 140, the cache storage unit 310 stored in the temporary buffer in step S203 (step S206).

Next, the page read-in part 124 extracts all column data described in the required column information 230 among one or more data access units 311 included in the cache storage unit 310 stored in the high speed storage 140 in step S206 (step S207). In other words, in step S207, the page read-in part 124 extracts not only the data access unit 311 corresponding to the top read-out data identified in step S104, but also extracts the data access unit 311 corresponding to other read-out data indicated in the required column information 230, among the cache storage units 310 stored in the high speed storage 140.

Next, the page read-in part 124 calls the cache memory management part 128 and determines whether the cache memory 130 has reached the storage limit (step S208). When the cache memory 130 has reached the storage limit (step S208; YES), the cache memory management part 128 applies the LRU method and selects, and erases, the data access unit 311 having an oldest last-access time among deletable data in the cache memory 130 (step S209). Note that, when a plurality of data access units 311 are extracted in step S207, it is possible to secure, by selecting and erasing a plurality of old data access units 311 in step S209, free space of a level capable of storing these new data access units 311.

Meanwhile, when the cache memory 130 has not reached the storage limit in step S208 (step S208; NO), or after step S209, the cache memory management part 128 stores, in the cache memory 130, the data access unit 311 extracted in step S207 (step S210). Subsequently, the page read-in part 124 returns the data access unit 311 extracted in step S207 to the query execution module 110, and proceeds to step S112 of FIG. 4.

Note that, as a modified example of the query execution processing in this embodiment, also in cases where the data access unit 311 corresponding to the read-out data is read out from the temporary buffer 123 or the high speed storage 140 (step S108 to S109, S110 to S111 of FIG. 4), the same processing as steps S208 to S210 may be performed to store the read-out data in the cache memory 130.

Step S112 is the processing to be executed after steps S106, S109, S111, S210 and, specifically, is the processing to be performed after the page read-in part 124 returns the data access unit 311 including the top read-out data identified in step S103 to the query execution module 110. In step S112, the query execution module 110 determines whether the received data access unit 311 is a search column. When the received data access unit 311 is a search column (step S112; YES), the query execution module 110 performs comparison processing using the column of the received data access unit 311 (step S113). Meanwhile, when the received data access unit 311 is not a search column (step S112; NO), since the data access unit 311 is an aggregation column, the query execution module 110 performs aggregation processing using this column (step S114).

After step S113 and step S114, the query execution module 110 determines whether the read out by the data read-out module 120 of all read-out data described in the required column information 230 created in step S102 is complete (step S115), and, when the read out of all read-out data is complete (step S115; YES), ends the query execution processing. If any incomplete read-out data is remaining (step S115, NO), the routine returns to step S103, and processing is repeated from the incomplete read-out data to the next top read-out data.

As described above, in the query execution processing, when the target data is stored in a plurality of storages (cache memory 130, high speed storage 140, temporary buffer 123), which are hierarchically storing data cashes, regarding the data of the required columns that need to be read out for executing the query 210, since the target data can be read out by giving preference to a faster storage, high-speed data read out using cache data can be realized. Moreover, when the handling unit of reading out data from the cache memory 130, the high speed storage 140, and the temporary buffer 123 is caused to be a data access unit that is smaller than the cache storage unit handled by the low speed storage 150, and the target data is read out from the slowest object storage (low speed storage 150), the used capacity per data in the cache memory 130 can be suppressed by extracting the data 311 of the data access unit having the required column among the data 310 of the read-out cache storage unit and storing it in the cache memory 130.

Furthermore, as explained in steps S207 and S210, by extracting all data 311 of the data access unit corresponding to the required column described in the required column information 230 from the data 310 of the cache storage unit read out from the low speed storage 150 and storing them in the cache memory 130, column data that is likely to be accessed next time onward can be prefetched and stored in the cache memory 130. As a result, when subsequently reading out data, since the cache data can be read out from the cache memory 130 at a high speed without having to once again read out the data 310 of the cache storage unit from the low speed storage 150, useless reading from the low speed storage 150 can be reduced, and efficiency of the memory cache can be improved. Furthermore, with the storage system 1, since the data of the required column can be read out at a high speed as described above, the processing of search or connection in the database can be executed at a high speed, and the performance can thereby be improved.

(2-2) Column Processing

Figure 6:
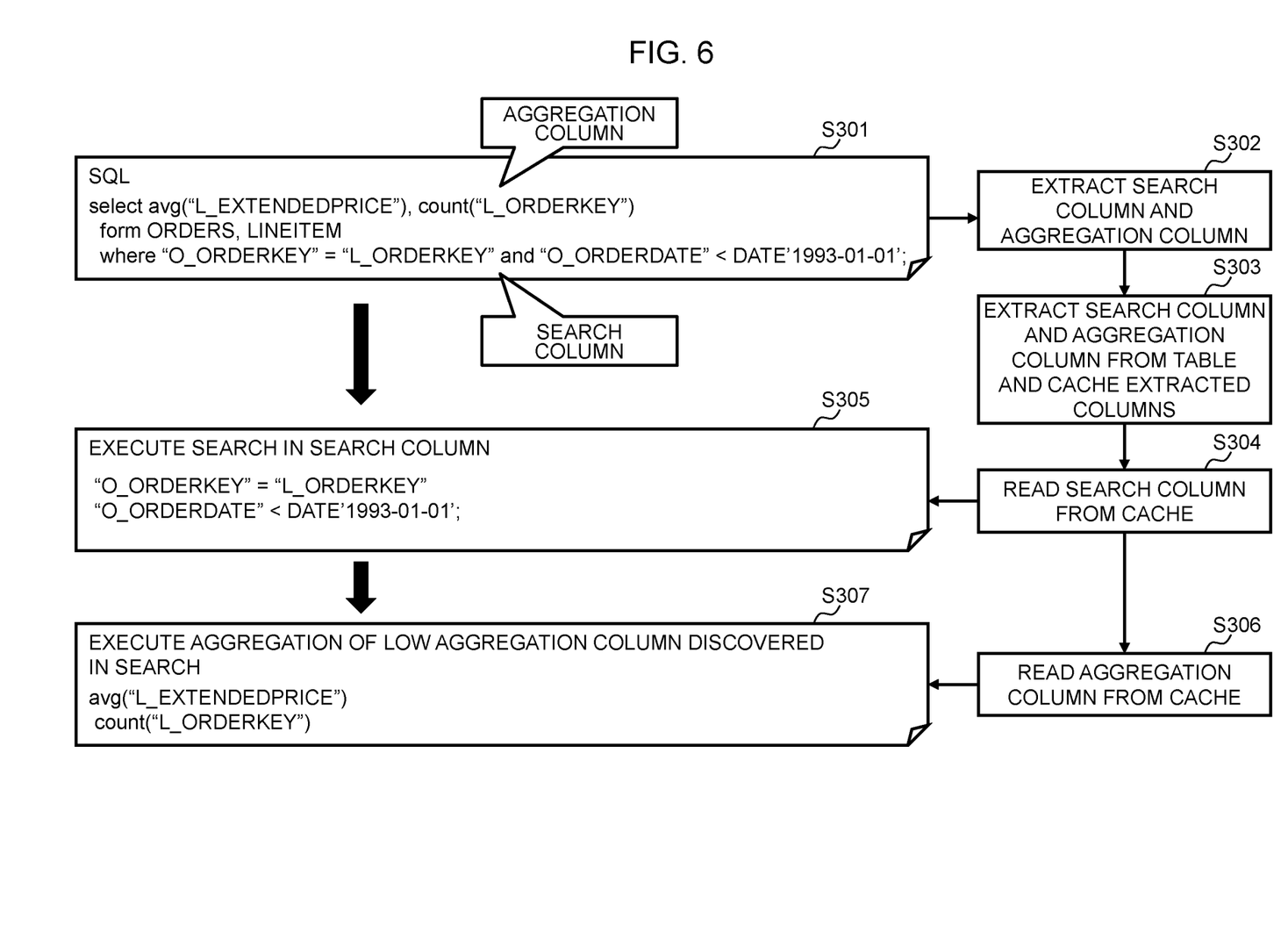
FIG. 6 is a diagram explaining an example of the processing image of columns in the query execution processing.

FIG. 6 is a diagram explaining an example of the processing image of columns in the query execution processing.

Foremost, step S301 of FIG. 6 shows an example of the query 210 of SQL issued by the client 20. Since the 1st line of this SQL query describes matters regarding the aggregation processing, the column that appears in the 1st line is extracted as the aggregation column. Moreover, the table to be used is described in the 2nd line, and the search conditions are described in the 3rd line. Thus, the column that appears in the 3rd line is extracted as the search column. In other words, when the DBMS 100 interprets the SQL query of step S301, the aggregation column is extracted from the 1st line, and the search column is extracted from the 3rd line (step S302). The processing of steps S301 and S302 corresponds to the processing of steps S101 and S102 of FIG. 4.

Next, the DBMS 100 extracts the search column and the aggregation column from the database table, and caches them in the cache memory 130 (step S303). Subsequently, the DBMS 100 reads the search column from the cache (step S304), and executes the search (step S305). Specifically, the DBMS 100 executes the search using the conditional expression shown in step S305. Next, the DBMS 100 reads out the aggregation column from the cache for those that resulted in a hit in the search (step S306), and executes the aggregation calculation as shown in step S307.

(2-3) Cache Processing

Figure 7:
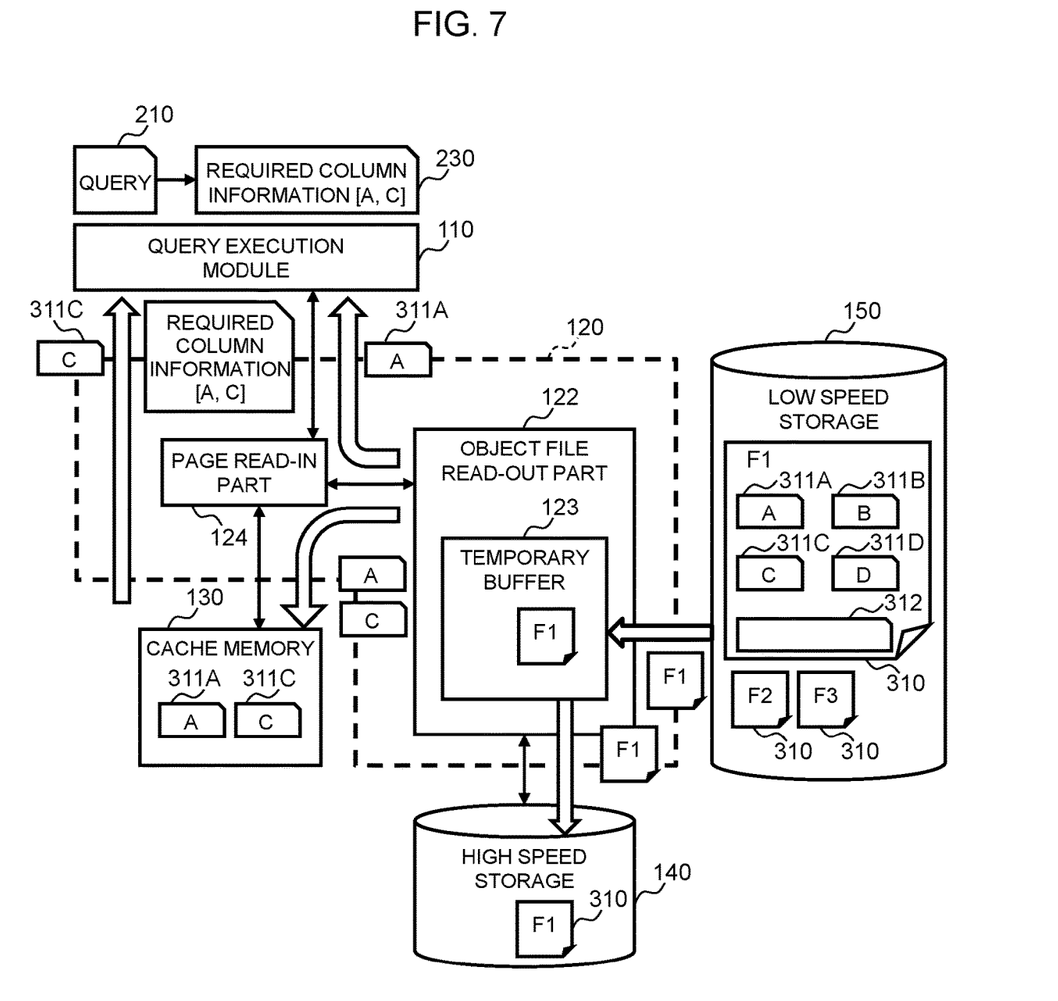
FIG. 7 is a diagram explaining an example of the processing image of caches in the query execution processing.

FIG. 7 is a diagram explaining an example of the processing image of caches in the query execution processing. FIG. 7 shows a flow of an object file stored in the low speed storage 150 being read out and a part thereof being cached by using a part of the configuration of the storage system 1 shown in FIG. 1 and FIG. 3.

According to FIG. 7, foremost, the query execution module 110 creates required column information 230 from the query 210. In this example, let it be assumed that data 311A (column A) and data 311C (column C) are identified as the required columns. The required column information 230 is sent to the page read-in part 124 (or the cache storage unit identification part 121), divided into the required columns A and C, and the data 311A and 311C of the data access unit including the respective required columns are identified. In this example, let it be assumed that these data 311A and 311C were revealed as being included in data F1 of the cache storage unit.

Here, at the point in time that the data 311A and 311C of the data access unit are identified, the cache memory 130 is not storing any data. Thus, the page read-in part 124 makes an inquiry to the cache memory 130 and consequently confirms that the data 311A and 311C do not exist in the cache memory 130. Next, the page read-in part 124 confirms that the data F1 of the cache storage unit does not exist in the high speed storage 140. Thus, the page read-in part 124 sends the identified information of the data 311A and 311C to the object file read-out part 122.

Subsequently, the object file read-out part 122 reads the data F1 of the cache storage unit from the low speed storage 150, and stores it in the temporary buffer 123. Next, the object file read-out part 122 also stores the data F1 in the high speed storage 140.

Next, the page read-in part 124 extracts the data 311A and 311C of the data access unit existing inside the data F1 by using the data access unit management information 312 of the data F1 included in the segment management information 127. Subsequently, the page read-in part 124 sends the data 311A corresponding to the top read-out data to the query execution module 110 and the cache memory 130, and sends the data 311C, which is not yet used at this point in time, to the cache memory 130.

The query execution module 110 receives the data 311A, continues the query processing, and performs the search. When it is determined that the data 311C is required as a result of the search, the page read-in part 124 reads the data 311C stored in the cache memory 130 first, and sends it to the query execution module 110. Subsequently, the query execution module 110 that received the data 311C executes the aggregation processing.

Note that, in the foregoing explanation, while the data 311A and 311C having the required column were included in the data F1 of one cache storage unit, when the data 311 of the data access unit having the required column exists in the data 310 (for example, data F1 and data F2) of a plurality of cache storage units, the foregoing processing may be sequentially performed to the corresponding data F1 and data F2.

As a result of the cache processing being performed in the manner described above, since the storage system 1 can cache in advance the data 311 of the data access unit, which is likely to be accessed next, in the cache memory 130 with numerous limiting conditions regarding capacity (simply put, having a storage capacity that is smaller than other storages), the usage efficiency of the cache memory 130 can be improved, and the processing performance of the database can thereby be improved.

Note that the present invention is not limited to the embodiment described above, and includes various modified examples. For example, the foregoing embodiment was explained in detail for explaining the present invention in an easy-to-understand manner, but the present invention does not need to necessarily comprise all of the configurations explained in the embodiment. Moreover, another configuration may be added to, deleted from or replaced with a part of the configuration of the foregoing embodiment.

Moreover, while control lines and information lines are illustrated in the drawings to the extent required for explaining the present invention, not all control lines and information lines required for the product may necessarily be indicated. In effect, it may be understood that nearly all of the configurations are mutually connected.

REFERENCE SIGNS LIST 1 storage system
10 server
20 client
100 DBMS
110 query execution module
120 data read-out module
121 cache storage unit identification part
122 object file read-out part
123 temporary buffer
124 page read-in part
125 high speed storage write-out part
126 high speed storage read-in part
127 segment management information
128 cache memory management part
130 cache memory
140 high speed storage
150 low speed storage
160 network
210 query
220 column list
230 required column information
310 data (cache storage unit)
311 data (data access unit)
312 data access unit management information

The invention claimed is:
1. A storage system which stores data of a database in at least one non-transitory storage medium, the storage system comprising:

a database management system which manages the database based on an execution of a program by a processor; and
a storage device,
wherein
the storage device includes:
a first storage which stores data of a table of the database;
a second storage in which reading and writing of data is faster than the first storage; and
a third storage, being a cache memory, in which reading and writing of data is faster than the second storage,
the first storage reads and writes a first-data-size-unit data which is data based on a first data size unit and which includes one or more pieces of second-data-size-unit data and data access unit management information and the third storage reads and writes the second-data-size-unit data which is data based on a second data size unit,
the data access unit management information is information for representing that the one or more pieces of second-data-size-unit data exist inside the first-data-size-unit data and at least from where each of the one or more pieces of second-data-size-unit data was acquired and in which column of the table of the database each of the one or more pieces of second-data-size-unit data was included,
the second-data-size-unit data is smaller than the first data size unit,
the size of the second-data-size-unit data is the same as the size where the data access unit management information is removed from the first-data-size-unit data, and
when the database management system executes a query as an inquiry to the database,
the database management system:
interprets the query and identifies a required column which is required for executing the query;
reads out data of the identified required column from the storage device;
executes the query based on the data of the required column read out from the storage device;
when preferentially reading out the data of the required column in order from the third storage, the second storage and the first storage to read out the data of the required column from the storage device, and
in a case where the data of the required column is stored in the first storage and is not stored in the second and third storage,
reads out one or more pieces of first-data-size-unit data including the data of the required column, each of the one or more pieces of first-data-size-unit data including at least part of the data of the required column as one or more pieces of second-data-size-unit data the data access unit management information of the at least part of the data of the required column;
for each of the read-out one or more pieces of first-data-size-unit data, extracts one or more pieces of second-data-size-unit data as the at least part of the data of the required column from the each piece of first-data-size-unit data by removing the data access unit management information from the each piece of first-data-size-unit data, and stores the extracted one or more pieces of second-data-size-unit data in the third storage; and
stores the read-out one or more pieces of first-data-size-unit data in the second storage.

2. The storage system according to claim 1, wherein the database management system:

identifies, by interpreting the query, a calling order of the required column when executing the query; and
repeats, according to the identified calling order, a process of reading out the data of the required column from the third storage, the second storage, or the first storage, storing the read-out data of the required column in the memory and/or the second storage, and executing the query using the read-out data of the required column.

3. The storage system according to claim 1, wherein
the data of the required column includes data of a search column used for search processing requested in the query, and data of an aggregation column used for aggregation processing requested in the query.

4. The storage system according to claim 1, wherein
the database management system:
free space when writing data in the second storage, writes new data after deleting data of the first-data-size-unit having an oldest last-access time among deletable data in the second storage; and
when there is a lack of free space when writing data in the memory, writes new data after deleting data of the second-data-size-unit having an oldest last-access time in the third storage.

5. The storage system according to claim 1, wherein
the first storage is an object storage installed separately from a server on which the database management system is running, and sends and receives an object file in the first-data-size-unit to and from the server via a network.

6. A data cache method performed by a storage system which stores data of a database in at least one non-transitory storage medium, wherein the storage system comprises:
a database management system which manages the database based on an execution of a program by a processor; and
a storage device,
wherein
the storage device includes:
a first storage which stores data of an entire table of the database;
a second storage in which reading and writing of data is faster than the first storage; and
a third storage, being a cache memory, in which reading and writing of data is faster than the second storage;
the first storage reads and writes a first-data-size-unit data which is data based on a first data size unit and which includes one or more pieces of second-data-size-unit data and data access unit management information and the third storage reads and writes the second-data-size-unit data which is data based on a second data size unit,
the data access unit management information is information for representing that the one or more pieces of second-data-size-unit data exist inside the first-data-size-unit data and at least from where each of the one or more pieces of second-data-size-unit data was acquired and in which column of the table of the database each of the one or more pieces of second-data-size-unit data was included,
the second-data-size-unit data is smaller than the first data size unit,
the size of the second-data-size-unit data is the same as the size where the data access unit management information is removed from the first-data-size-unit data, and
when the database management system executes a query as an inquiry to the database,
the data cache method comprises:
a required column identification step of the database management system interpreting the query and identifying a required column which is required for executing the query;
a data read-out step of the database management system reading out, from the storage device, data of the required column identified in the required column identification step; and
a query execution step of the database management system executing the query based on the data of the required column read out in the data read-out step;
in the data read-out step, the database management system:
when preferentially reading out the data of the required column in order from the third storage, the second storage, and the first storage to read reading out the data of the required column from the storage device, anf
in a case where the data of the required column is stored in the first storage and is not stored in the second and third storage,
reads out one or more pieces of first-data-size-unit data including the data of the required column, each of the one or more pieces of first-data-size-unit data including at least part of the data of the required column as one or more pieces of second-data-size-unit data the data access unit management information of the at least part of the data of the required column;
for each of the read-out one or more pieces of first-data-size-unit data, extracts one or more pieces of second-data-size-unit data as the at least part of the data of the required column from the each piece of first-data-size-unit data by removing the data access unit management information from the each piece of first-data-size-unit data, and stores the extracted one or more pieces of second-data-size-unit data in the third storage; and
stores the read-out one or more pieces of first-data-size-unit data in the second storage.

* * * * *